(12) United States Patent
Grabon

(10) Patent No.: US 6,370,888 B1
(45) Date of Patent: Apr. 16, 2002

(54) METHOD FOR CONTROLLING VARIABLE SPEED DRIVE WITH CHILLER EQUIPPED WITH MULTIPLE COMPRESSORS

(75) Inventor: Michel Karol Grabon, Bressolles (FR)

(73) Assignee: Carrier Corporation, Farmington, CT (US)

(*) Notice: Subject to any disclaimer, the term of this patent is extended or adjusted under 35 U.S.C. 154(b) by 0 days.

(21) Appl. No.: 09/652,341

(22) Filed: Aug. 31, 2000

(51) Int. Cl.⁷ .............................. F25B 1/00; F25B 7/00
(52) U.S. Cl. ..................... 62/115; 62/204; 62/228.4; 62/230
(58) Field of Search ................. 62/175, 228.4, 62/230, 204, 115

(56) References Cited

U.S. PATENT DOCUMENTS 5,207,071 A * 5/1993 Ozu et al. .................. 62/175
5,809,794 A * 9/1998 Sibik et al. ................ 62/204
6,185,946 B1 * 2/2001 Hartman .................... 62/175

* cited by examiner

Primary Examiner—William Wayner
(74) Attorney, Agent, or Firm—Wall, Marjama & Bilinski, LLP

(57) ABSTRACT

The invention uses a variable speed drive (VSD) only on a range of capacities corresponding from zero to standard point conditions, and if conditions correspond to higher than rated point current, the VSD is disconnected and the compressor is connected directly on line. This approach allows using a smaller size VSD. At the same time, if there are several compressors operating in the same machine, only one VSD is needed. The VSD drives a first compressor from zero to the speed corresponding to the line frequency. Controls then switch the first compressor to direct on line (DOL) and disconnects the VSD from the first compressor. The VSD is then available to drive a second compressor. This process can be repeated through multiple compressors.

12 Claims, 2 Drawing Sheets

METHOD FOR CONTROLLING VARIABLE SPEED DRIVE WITH CHILLER EQUIPPED WITH MULTIPLE COMPRESSORS

FIELD OF THE INVENTION

The invention pertains to the field of chillers, and in particular to applying a variable speed drive to multiple chiller compressors.

BACKGROUND OF THE INVENTION

A simplified typical air conditioning or refrigeration cycle includes transferring heat into a refrigerant, pumping the refrigerant to a place where heat can be removed from it, and removing the heat from the refrigerant. A refrigerant is a fluid that picks up heat by evaporating at a low temperature and pressure and gives up heat by condensing at a higher temperature and pressure. In a closed system, the refrigerant is then cycled back to the original location where heat is transferred into it. In a mechanical system, a compressor converts the refrigerant from a low temperature and low pressure fluid to a higher temperature and higher pressure fluid. After the compressor converts the refrigerant, a condenser is used to liquefy the fluid (gas) by cooling during the condensing part of the cycle. In operation, hot discharge gas (refrigerant vapor) from the compressor enters the condenser coil at the top, condenses into a liquid as heat is transferred to the outdoors. The refrigerant then passes through a metering device, such as an expansion valve, where it is converted to a low temperature, low pressure fluid before entering an evaporator.

A variable speed drive (VSD) is an electronic device connected between a power line and a device which can vary supply voltage and frequency. When applied to a refrigeration compressor, a VSD permits continually varying the compressor speed, giving an advantage of smooth operation and better partial-load performance. A VSD has a relatively high cost, which is a significant problem that has to be solved to allow using this technology in chiller markets. The cost of a VSD is proportional to absorbed current, which in turn is a function of the compressor capacity and operating conditions. In order to cover the entire range of application of VSD driven compressors, a VSD must be chosen which can provide the current corresponding to maximum load conditions, i.e., high condensing temperature and high suction. In reality, the compressor operates in such conditions only a few days each year. A need therefore exists to control the VSD in such a way as to make it practical to use a VSD with multiple compressors.

SUMMARY OF THE INVENTION

Briefly stated, the invention uses a variable speed drive (VSD) only on a range of capacities corresponding from zero to standard point conditions, and if conditions correspond to higher than rated point current, the VSD is disconnected and the compressor is connected directly on line. This approach allows using a smaller size VSD. At the same time, if there are several compressors operating in the same machine, only one VSD is needed. The VSD drives a first compressor from zero to the speed corresponding to the line frequency. Controls then switch the first compressor to direct on line (DOL) and disconnects the VSD from the first compressor. The VSD is then available to drive a second compressor. This process can be repeated through multiple compressors.

According to an embodiment of the invention, a method for controlling at least one compressor of a chiller system with a variable speed drive includes the steps of: (a) checking to see if additional compressor capacity is needed by the system; (b) ensuring the at least one compressor is running from the variable speed drive if additional compressor capacity is needed by the system; (c) monitoring a current in the variable speed drive; (d) closing an electronic expansion valve by a specified amount in the system if the current is greater than a specified percentage of a maximum current; (e) increasing a frequency of the variable speed drive by a specified amount if the current is less than or equal to the specified percentage of the maximum current; (f) checking to see if the additional compressor capacity needed by the system is satisfied by step (e); (g) checking whether the frequency of the variable speed drive is equal to a frequency of line power powering the variable speed drive, and if not, performing steps (c) through (f) again; and (h) transitioning the at least one compressor from variable speed drive to directly on line.

According to an embodiment of the invention, an apparatus for controlling at least one compressor of a chiller system with a variable speed drive includes means for checking to see if additional compressor capacity is needed by the system; means for ensuring the at least one compressor is running from the variable speed drive if additional compressor capacity is needed by the system; means for monitoring a current in the variable speed drive; means for closing an electronic expansion valve by a specified amount in the system if the current is greater than a specified percentage of a maximum current; means for increasing a frequency of the variable speed drive by a specified amount if the current is less than or equal to the specified percentage of the maximum current; means for checking to see if the additional compressor capacity needed by the system is satisfied by increasing the frequency of the variable speed drive; means for checking whether the frequency of the variable speed drive is equal to a frequency of line power powering the variable speed drive; and means for transitioning the at least one compressor from variable speed drive to directly on line if the frequency of the variable speed drive is equal to the frequency of the line power.

DETAILED DESCRIPTION OF THE PREFERRED EMBODIMENT

Figure 1:
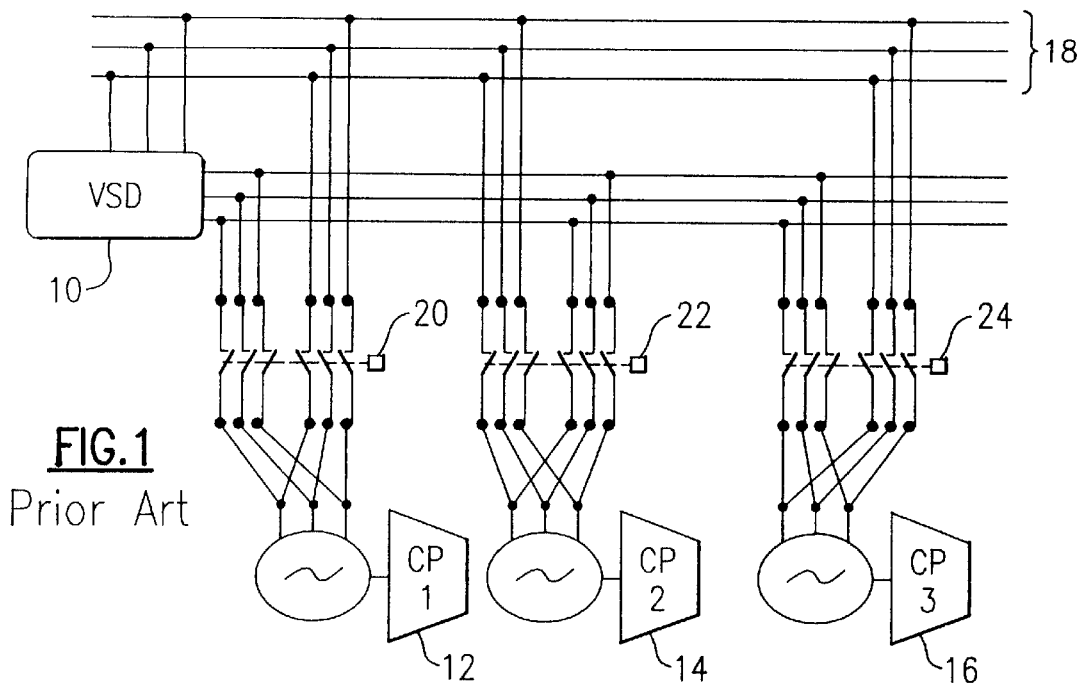
FIG. 1 shows a variable speed drive (VSD) connected to a plurality of compressors according to the prior art.

Referring to FIG. 1, a variable speed drive (VSD) 10 can run several compressors 12, 14, 16 in the same machine. A compressor can be connected to a power supply line 18 (60 or 50 Hz) or to VSD 10. VSD 10 drives a compressor motor to its synchronous speed and then controls switch the compressor motor to direct on line (DOL). That is, switches 20, 22, and 24 switch compressors 12, 14, 16, respectively, between VSD 10 and power line 18. This approach is not new and is already used in different industries.

What is original to this invention is that in the traditional approach the VSD capacity corresponds to the capacity of maximum input power. The present invention instead uses a VSD only to an "optimum" point on terms of input power and switches to DOL if higher input power is requested by a system. There are problems associated with transitioning between VSD and DOL, particularly when several compressors operate in the same circuit in parallel.

It is important to understand that compressor input power is a function of two parameters: discharge pressure and suction pressure. Motor input power (and current) increases when discharge pressure increases, and in the majority of conditions, this is the same for suction pressure. Therefore, for a given discharge pressure, if suction pressure is reduced, the input power of the compressor decreases. Discharge pressure depends on the operating conditions, i.e., for an air cooled chiller, if the ambient temperature is higher, the discharge pressure is higher also; while suction pressure depends on conditions in the evaporator. In general, if we want to decrease the input power we could act on either the condenser pressure or the suction pressure. In reality, for a given system, there is nothing we can do about the discharge pressure. The suction pressure can be reduced by closing the expansion valve on the system. If we are closing an electronic expansion valve (EXV), the performance of the evaporator is affected and the suction pressure is reduced. Although this situation is not suitable for normal operation, it is workable for a short period of time during the transition between VSD and DOL.

Figure 2:
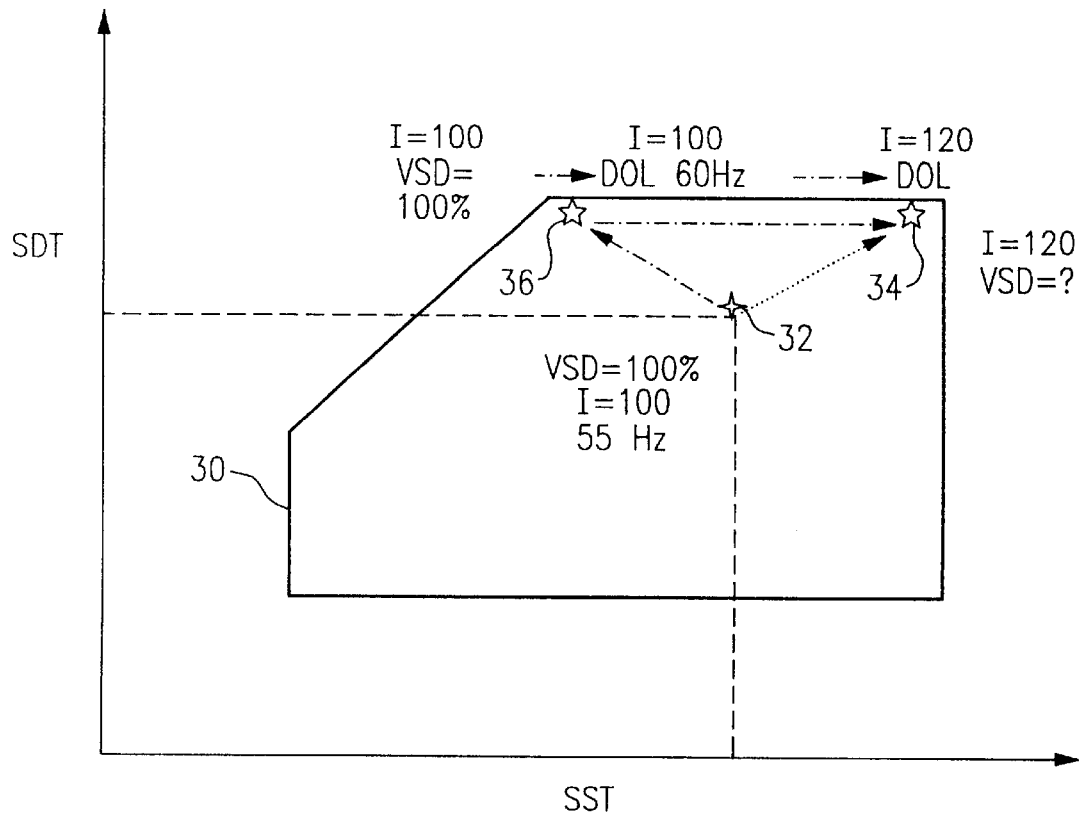
FIG. 2 shows an operating envelope for a compressor.

Referring to FIG. 2, an operating envelope 30 for a compressor is shown. The x-axis is the saturated suction temperature (SST), which is an image of the suction pressure. The y-axis is the saturated condensing temperature (SCT), which is an image of the discharge pressure. A star 32 corresponds to standard operating conditions and a VSD which gives 100% of its capacity (I=100) in this particular condition is chosen. In an hypothetical situation, the out door temperature is higher then standard conditions, and the leaving water temperature is also higher. The operating conditions are thus affected, and need to go from star 32 to a star 34. The problem with this transition is that at star 34, the requested input power is higher than the VSD can provide (I>100%).

However, the frequency provided by the VSD corresponding to star 32 can be lower than the power line frequency (60 Hz in the U.S.). The transition between the VSD and DOL can be only done if the VSD frequency is equal to the line frequency. Therefore, to move the operating conditions from star 32 to star 34, the following method is used. The EXV is closed by the system controller, which reduces the unit capacity and suction pressure, thereby reducing the input current. Then, the VSD frequency is increased because the input power is proportional to the frequency. The operating conditions go from star 32 to a star 36, which then makes the transition between the VSD and DOL possible. The operating point at star 36 impacts the unit performances but is only a transient mode. Once the transition from VSD to DOL is completed and the compressor motor is DOL, the EXV is opened and the system resumes standard EXV controls, which optimize the unit efficiency. The compressor can now operate up to the extreme conditions in DOL mode and the VSD is available to start up another compressor if needed.

Figure 3:
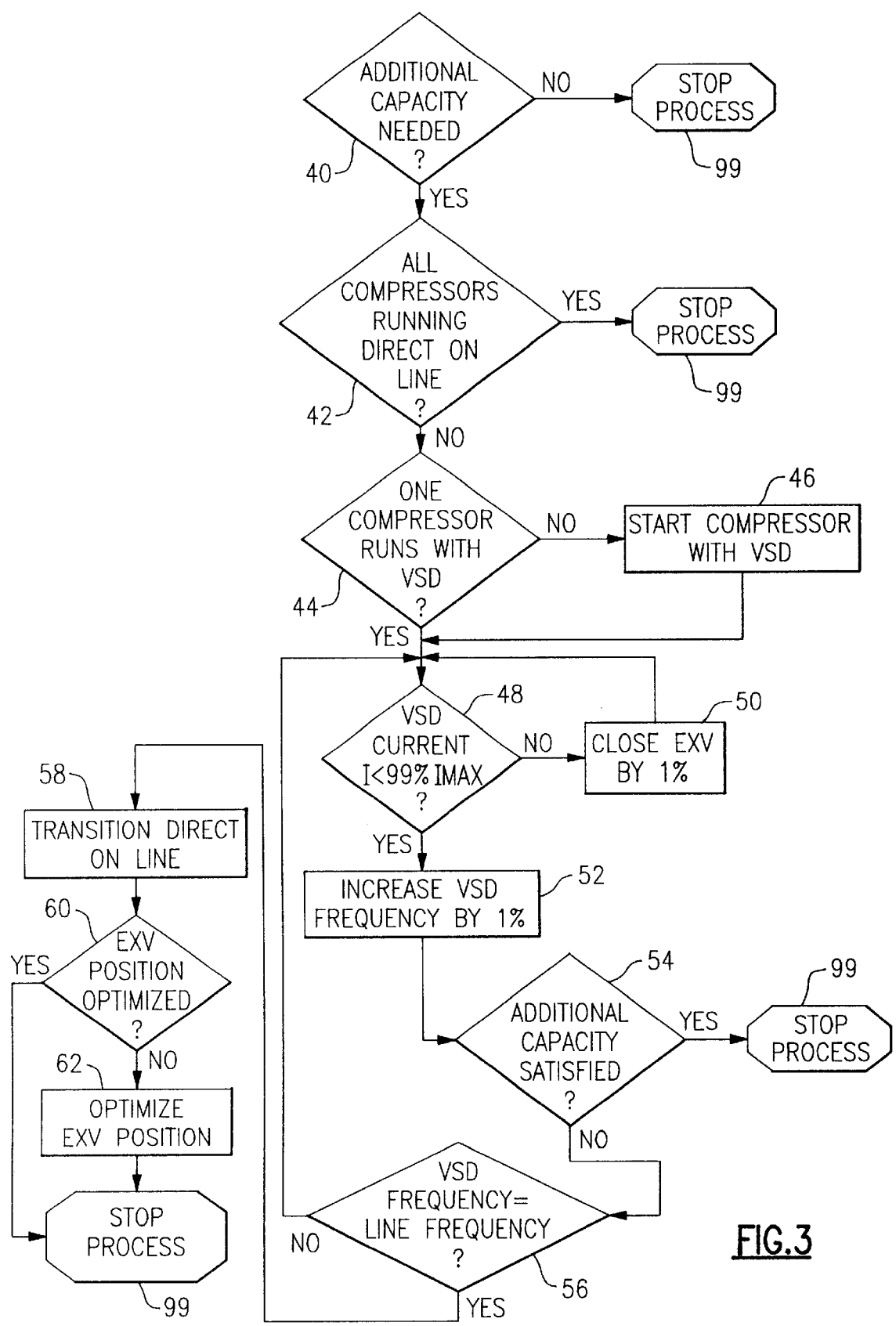
FIG. 3 shows a basic control method to implement the invention.

Referring to FIG. 3, a basic control method to implement the invention is shown. The process begins at step 40 when the decision is made whether additional capacity is needed. If not, the process stops at step 99. If additional capacity is needed, the system is checked in step 42 to see if all compressors are already running DOL. If so, the process stops. If not, step 44 checks to see if one compressor is up and running with VSD. If not, that compressor is started in step 46. Then, in step 48, the VSD current is checked to see if it is near to the maximum VSD current. The example used herein checks to see if the VSD current is less than 99% of the maximum VSD current, but other ranges could be used.

If not, the EXV is closed by a minimum amount, shown here to be 1% in step 50, and the VSD current is checked again. If the VSD current is greater than or equal to 99% of the maximum VSD current, the VSD frequency is increased by a minimal amount, shown here as 1%, thereby increasing the input power. The precise changes in the EXV and VSD frequency can be varied depending on the system.

In step 54, the system checks to see if the need for additional capacity satisfied. If so, the process stops. If not, the VSD frequency is checked to see if it has reached the line frequency. If not, the process goes back to step 48. If the VSD frequency has reached the line frequency, the system transitions the compressor to DOL in step 58. After the transition, the EXV position is checked in step 60 to see if it is optimized. If so, the process stops. If not, the EXV position is optimized in step 62. The process always starts if additional capacity is needed by the system.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for controlling at least one compressor of a chiller system with a variable speed drive, comprising the steps of:
    a) checking to see if additional compressor capacity is needed by said system;
    b) ensuring said at least one compressor is running from said variable speed drive if additional compressor capacity is needed by said system;
    c) monitoring a current in said variable speed drive;
    d) closing an electronic expansion valve by a specified amount in said system if said current is greater than a specified percentage of a maximum current;
    e) increasing a frequency of said variable speed drive by a specified amount if said current is less than or equal to said specified percentage of said maximum current,
    f) checking to see if said additional compressor capacity needed by said system is satisfied by step (e);
    g) checking whether said frequency of said variable speed drive is equal to a frequency of line power powering said variable speed drive, and if not, performing steps (c) through (f) again; and
    h) transitioning said at least one compressor from variable speed drive to directly on line.

2. A method according to claim 1, further comprising the step of optimizing a position of said electronic expansion valve after the step of transitioning of said position is not optimized.

3. A method according to claim 1, wherein said specified percentage of maximum current is 99 percent.

4. A method according to claim 3, wherein said specified amount for closing said electronic expansion valve is one percent.

5. A method according to claim 4, wherein said specified amount for increasing said frequency is one percent.

6. A method according to claim 1, wherein said at least one compressor includes at least first and second compressors, said first compressor is running directly on line, and said step of ensuring includes the steps of checking whether both said first and second compressors are running directly on line, and if not, starting said second compressor running from said variable speed drive.

7. An apparatus for controlling at least one compressor of a chiller system with a variable speed drive, comprising:

means for checking to see if additional compressor capacity is needed by said system;

means for ensuring said at least one compressor is running from said variable speed drive if additional compressor capacity is needed by said system;

means for monitoring a current in said variable speed drive;

means for closing an electronic expansion valve by a specified amount in said system if said current is greater than a specified percentage of a maximum current;

means for increasing a frequency of said variable speed drive by a specified amount if said current is less than or equal to said specified percentage of said maximum current;

means for checking to see if said additional compressor capacity needed by said system is satisfied by increasing said frequency of said variable speed drive;

means for checking whether said frequency of said variable speed drive is equal to a frequency of line power powering said variable speed drive; and means for transitioning said at least one compressor from variable speed drive to directly on line if said frequency of said variable speed drive is equal to said frequency of said line power.

8. Apparatus method according to claim 7, further comprising means for optimizing a position of said electronic expansion valve after said at least one compressor is transitioned from said variable speed drive to said line power.

9. A method according to claim 7, wherein said specified percentage of maximum current is 99 percent.

10. A method according to claim 9, wherein said specified amount for closing said electronic expansion valve is one percent.

11. A method according to claim 10, wherein said specified amount for increasing said frequency is one percent.

12. A method according to claim 7, wherein said at least one compressor includes at least first and second compressors, said first compressor is running directly on line, and means for ensuring includes means for checking whether both said first and second compressors are running directly on line, and if not, means for starting said second compressor running from said variable speed drive.

* * * * *